US009379588B2

(12) United States Patent
Matsubara et al.

(10) Patent No.: US 9,379,588 B2
(45) Date of Patent: Jun. 28, 2016

(54) STATOR OF ROTATING ELECTRICAL MACHINE AND ROTATING ELECTRICAL MACHINE

(71) Applicants: Masakatsu Matsubara, Yokkaichi (JP); Yoichi Seo, Nagoya (JP); Takashi Hanai, Nagoya (JP); Wataru Ito, Mie (JP)

(72) Inventors: Masakatsu Matsubara, Yokkaichi (JP); Yoichi Seo, Nagoya (JP); Takashi Hanai, Nagoya (JP); Wataru Ito, Mie (JP)

(73) Assignees: Kabushiki Kaisha Toshiba, Tokyo (JP); Toshiba Industrial Products Manufacturing Corporation, Mie (JP)

( * ) Notice: Subject to any disclaimer, the term of this patent is extended or adjusted under 35 U.S.C. 154(b) by 637 days.

(21) Appl. No.: 13/745,171

(22) Filed: Jan. 18, 2013

(65) Prior Publication Data

US 2013/0127290 A1 May 23, 2013

(30) Foreign Application Priority Data

Jul. 20, 2010 (JP) .................................. 2010-162767
Feb. 22, 2011 (WO) ......................... PCT/JP11/53816

(51) Int. Cl.
*H02K 3/38* (2006.01)
(52) U.S. Cl.
CPC ........................................ *H02K 3/38* (2013.01)
(58) Field of Classification Search
CPC ........... H02K 3/32; H02K 3/34; H02K 3/345; H02K 3/38; H02K 3/40
USPC ........................................ 310/208, 214, 215
See application file for complete search history.

(56) References Cited

U.S. PATENT DOCUMENTS 5,659,219 A 8/1997 Momose et al.
2004/0164636 A1* 8/2004 Okamoto et al. ............. 310/179

FOREIGN PATENT DOCUMENTS

| JP | H07-298530 | 11/1995 |
| JP | 2007-143354 | 6/2007 |
| JP | 2007-143354 A | 6/2007 |
| JP | 2008-141921 | 6/2008 |
| JP | 2008-141921 A | 6/2008 |

(Continued)

OTHER PUBLICATIONS

Matsubara et al., Machine translation of jp2008141921, Jun. 2008.*
Tanaka, Machine translation of jp2009005464, Jan. 2009.*

(Continued)

*Primary Examiner* — Quyen Leung
*Assistant Examiner* — Eric Johnson
(74) *Attorney, Agent, or Firm* — Baker Botts L.L.P.

(57) ABSTRACT

A stator of a rotating electrical machine includes a stator core, plural stator coil groups constituting plural phases, plural pieces of interphase insulation paper for insulation of coils belonging to different phases, and plural connecting strips formed integrally with the interphase insulation paper pieces. Each interphase insulation paper piece has ends inserted between coil ends of unit coils belonging to an identical phase thereby to function as interphase insulation paper for insulation of coils belonging to the identical phase. Each interphase insulation paper piece for insulation of coils belonging to the different phases, functioning as the interphase insulation paper piece for insulation of coils of the identical phase, insulates between coil ends of the first unit coils of respective first and second series circuits constituting the inner circumference side phase and a coil end of the unit coil constituting the outer circumference side phase.

3 Claims, 11 Drawing Sheets

(56) References Cited

FOREIGN PATENT DOCUMENTS

JP    2009-005464      1/2009
JP    2009-005464 A    1/2009

OTHER PUBLICATIONS

Official Action issued in related Japanese Patent Application No. 2010-162767 mailed Jan. 21, 2014, 5 pages (with translation.).
Official Action issued in related Japanese Patent Application No. 2010-162767 mailed Feb. 24, 2015, 4 pages (with translation).
Third Official Action issued in corresponding Mexican Patent Application No. MX/a/2013/000632 mailed Apr. 23, 2014; 5 pgs (with translation).
Decision of Refusal issued in related Japanese Patent Application No. 2010-162767 mailed Jul. 1, 2014, 5 pages.
Official Action issued in corresponding Mexican Patent Application No. MX/a/2013/000632 mailed Aug. 22, 2013; 2 pgs (with translation).
International Search Report issued in corresponding PCT Application No. PCT/JP2011/053816, mailed Apr. 19, 2011; 2 pgs.
Office Action issued in related Chinese Patent Application No. 201180035473.X mailed Sep. 29, 2014, 14 pages (with Translation.).
International Search Report Dated Apr. 19, 2011.
Second Official Action issued in corresponding Mexican Patent Application No. MX/a/2013/000632 mailed Mar. 19, 2013; 6 pgs (with translation).

* cited by examiner

STATOR OF ROTATING ELECTRICAL MACHINE AND ROTATING ELECTRICAL MACHINE

CROSS-REFERENCE TO RELATED APPLICATIONS

This application is based upon and claims the benefit of priority from the prior Japanese Patent Application No. 2010-162767 filed on Jul. 20, 2010 and International Application No. PCT/JP2011/053816 filed on Feb. 22, 2011, the entire contents of both of which are incorporated herein by reference.

FIELD

Embodiments described herein relate to a stator of a rotating electrical machine and a rotating electrical machine provided with the stator.

BACKGROUND

A permanent magnet type electric motor (hereinafter, "permanent magnet motor") employing an inverter drive system is known as a conventional electric motor serving as a rotating electrical machine for vehicles, which are used in electric vehicles or hybrid cars. The permanent magnet motor is constructed by a stator core on which stator coils are wound to constitute a plurality of phases, for example, three phases of U, V and W. The permanent magnet motor includes sheets of interphase insulation paper inserted between coil ends of the stator coils (between U and V phases, between V and W phases and the like; and hereinafter referred to as "between different phases"), so that the coil ends of the stator coils are prevented from contact with each other.

Each one of the stator coils includes a plurality of generally series-connected unit coils, and there is a possibility that coil ends of adjacent unit coils may be brought into contact with each other between the stator coils of the same phase (hereinafter referred to as "between the same phases") as well as between different phases. For example, in the permanent magnet motor of the vehicle, a drive voltage has been rendered higher for the purposes of higher output. Furthermore, an inverter serge voltage having a steep rise by inverter drive is applied to the motor.

DETAILED DESCRIPTION

In general, according to one embodiment, a stator of a rotating electrical machine includes a stator core which is annular in shape. A plurality of stator coil groups constitutes a plurality of phases. Each-phase stator coil group is wound on the stator core and includes a plurality of unit coils connected to each other and arranged in a radial direction with respect to the stator core. A plurality of pieces of interphase insulation paper for insulation of coils belonging to different phases is disposed at both axial ends of the stator core between coil ends of the unit coils which belong to different phases and are disposed at a radially inner circumference side with respect to the stator core. The interphase insulation paper pieces have ends which are inserted between the coil ends of the unit coils belonging to an identical phase, respectively, thereby to function as interphase insulation paper for insulation of coils belonging to the identical phase. A plurality of connecting strips is formed integrally with the interphase insulation paper pieces and each connects a pair of interphase insulation paper pieces disposed at both ends of the stator core when inserted in a slot of the stator core. Each-phase stator coil group includes a plurality of unit coils which are divided into a first series circuit and a second series circuit, and each one of the series circuits has one of two terminals connected to a power supply terminal and the other connected to a neutral terminal, whereby the unit coils are connected into an adjacent pole connection manner or an alternate pole connection manner. Each interphase insulation paper piece for insulation of coils belonging to the different phases, functions as the interphase insulation paper piece for insulation of coils belonging to the identical phase and insulates between coil ends of the first unit coils of the respective first and second series circuits constituting a stator inner circumference side phase and a coil end of the unit coil constituting a stator outer circumference side phase. Each interphase insulation paper piece has ends inserted between the coil ends of the first unit coils of the respective first and second series circuits constituting a stator inner circumference side phase and the coil end of the unit coil which is circumferentially adjacent to the coil ends of the first unit coils and constitutes a phase identical with a phase of the first unit coils of the respective first and second series circuits. The coil ends of the first unit coils have a largest shared voltage in the adjacent pole connection manner or the alternate pole connection manner out of the unit coils belonging to the identical phase.

First Embodiment

A first embodiment will be described with reference to FIGS. 1 to 6. The first embodiment is applied to a permanent magnet motor of the inverter drive system used in electric vehicles or hybrid cars.

Figure 2:
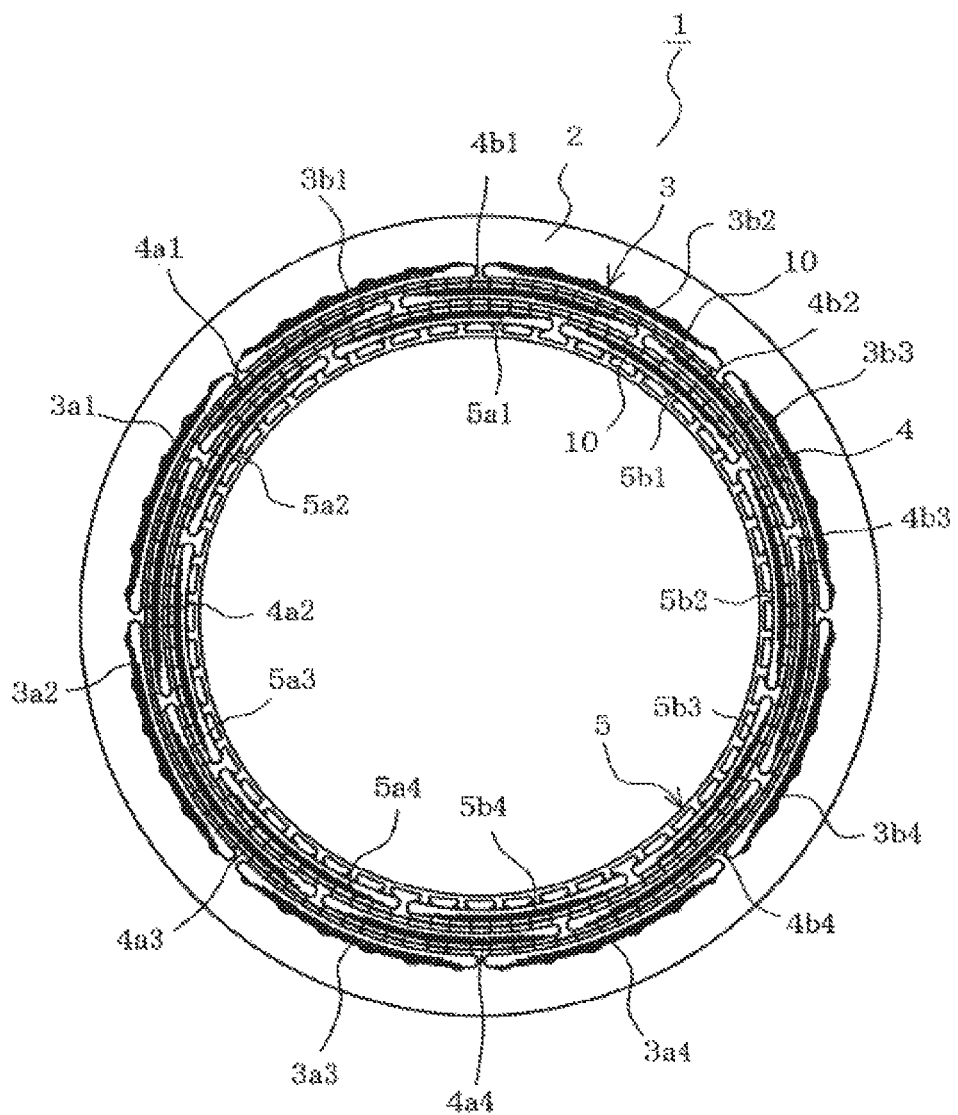
FIG. 2 is a schematic view of the stator.

Referring to FIG. 2, the permanent magnet motor includes a stator 1 composed of a stator core 2 and stator coils wound on the stator core 2. The stator coils constitute a plurality of phases, for example, three phases (namely, a U-phase coil group 3, a V-phase coil group 4 and a W-phase coil group 5 as will be described later). The stator core 2 is formed by stacking a plurality of core pieces into a cylindrical shape. The core pieces are punched out of, for example, an electromagnetic steel sheet into an annular shape with a press. The stator core 2 has a plurality of, for example, forty-eight slots 6 formed in an inner circumference side thereof. The stator coil groups (the U-phase coil group 3, the V-phase coil group 4 and the W-phase coil group 5) are inserted into the slots 6. Each stator coil group (the U-phase coil group 3, the V-phase coil group 4 and the W-phase coil group 5) is configured by winding a wire such as an enamel wire made by applying insulating coating to a cupper wire, a litz wire made by bundling a plurality of the aforementioned wires, or the like. In the embodiment, the U-phase coil group 3, the V-phase coil group 4 and the W-phase coil group 5 are sequentially attached to the stator core 2 radially from an outer circumference side to an inner circumference side. The wording "each-phase stator coil group" will be used without use of reference numerals 3 to 5 in the following when the description is common to the U-, V- and W-phase coils groups.

Figure 3:
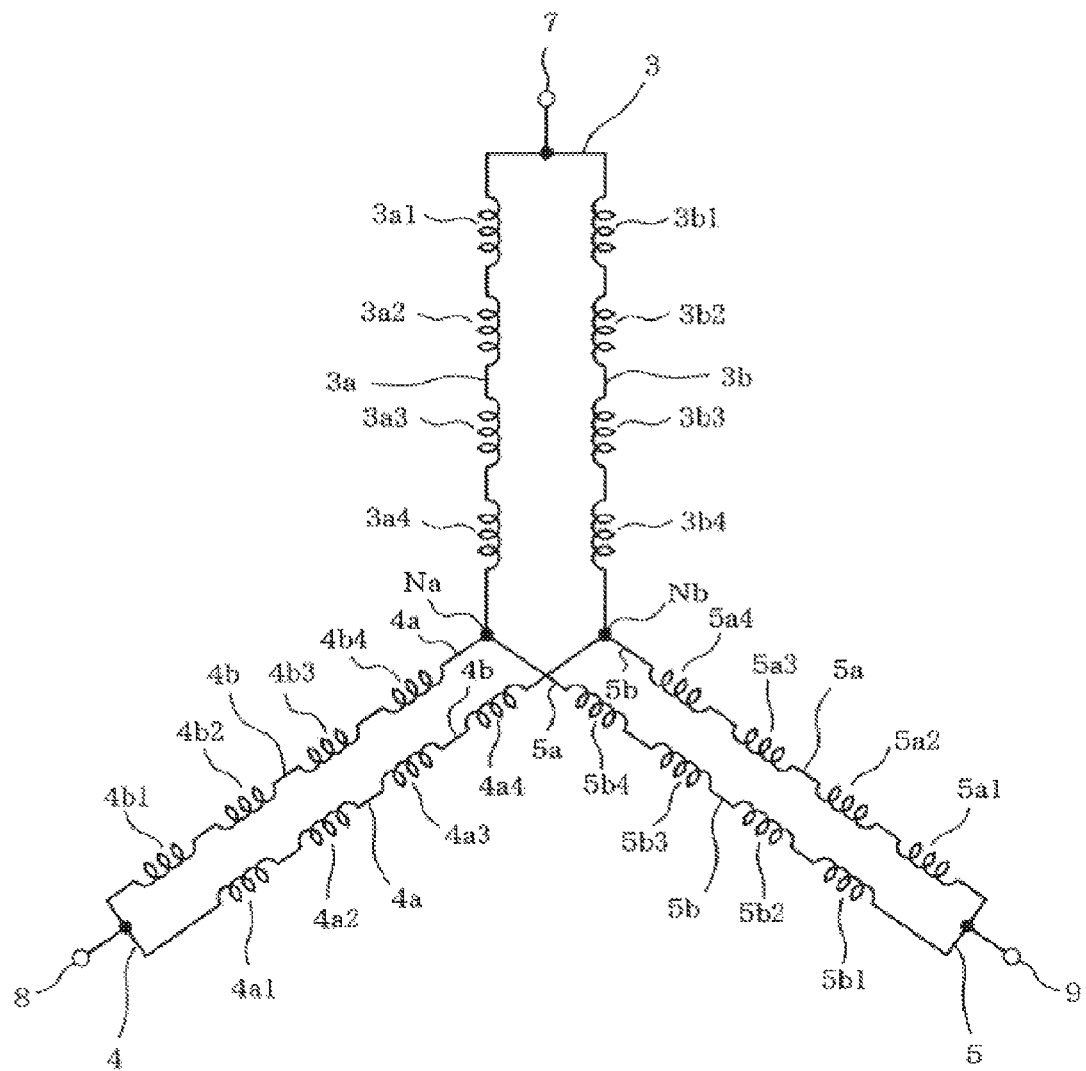
FIG. 3 is a schematic diagram showing a circuit equivalent to three-phase stator coils.

FIG. 3 shows an electrical circuit equivalent to the stator coil groups. Each-phase stator coil group includes a plurality of, for example, eight unit coils, which are divided in half. More specifically, the U-phase coil group 3 includes a first series circuit 3a composed of four series-connected (or series-coupled) unit coils 3a1, 3a2, 3a3 and 3a4 and a second series circuit 3b composed of four series-connected (or series-coupled) unit coils 3b1, 3b2, 3b3 and 3b4. In the same way, the V-phase coil group 4 includes a first series circuit 4a composed of four series-connected (or series-coupled) unit coils 4a1, 4a2, 4a3 and 4a4 and a second series circuit 4b composed of four series-connected (or series-coupled) unit coils 4b1, 4b2, 4b3 and 4b4. The W-phase coil group 5 includes a first series circuit 5a composed of four series-connected (or series-coupled) unit coils 5a1, 5a2, 5a3 and 5a4 and a second series circuit 5b composed of four series-connected (or series-coupled) unit coils 5b1, 5b2, 5b3 and 5b4. In the following description, each-phase unit coil group will be referred to as a first unit coil, a second unit coil, a third unit coil and a fourth unit coil sequentially from the one located nearest a power-supply terminal (a U-phase power-supply terminal 7, a V-phase power-supply terminal 8 and a W-phase power-supply terminal 9 as will be described later). The series circuits 3a, 3b, 4a, 4b, 5a and 5b will be referred to as "each series circuit" without use of the reference symbols when the description is common to the series circuits 3a, 3b, 4a, 4b, 5a and 5b.

Each-phase series-connected circuits 3a, 3b, 4a, 4b, 5a and 5b have one terminals connected to a U-phase power-supply terminal 7, a V-phase power-supply terminal 8 and a W-phase power-supply terminal 9 serving as three-phase power-supply terminals, respectively. The series circuits 3a, 4a and 5a have the other ends which are located opposite the power-supply terminals 7, 8 and 9 of the series circuits 3a, 4a and 5a and are connected to a neutral point Na. In the same way, the series circuits 3b, 4b and 5b have the other ends which are located opposite the power-supply terminals 7, 8 and 9 of the series circuit 3b, 4b and 5b and are connected to a neutral point Nb. More specifically, the stator core 2 is provided with the stator coils which are connected into the first series circuits 3a, 4a and 5a and the second series circuits 3b, 4b and 5b both of which are further parallel connected (double star connection), respectively. The first and second series circuits 3a, 4a and 5a and 3b, 4b and 5b are connected by an adjacent pole connection.

A step of winding each-phase stator coil group provided on the stator core 2 will be described in brief. The slots 6 of the stator core 2 with inner walls to which pieces of insulation paper or the like are affixed respectively, whereby slot insulation is applied to the slots 6 to electrically insulate between each-phase stator coil group provided in the respective slots 6 and the stator core 2 (the inner walls of the slots 6). Firstly, the U-phase coil group 3 is wound so as to be located at innermost interiors of the slots 6 (at the outer circumference side of the stator core 2) to which the slot insulation has been applied. Subsequently, a plurality of pieces of interphase insulation paper 10 for insulation of coils belonging to different phases is provided along coil ends of the U-phase coil group 3 over an entire circumference of the stator core 2 in order to insulate between coil ends of the U-phase coil group 3 and coil ends of the V-phase coil group 4 which is to be inserted next. The interphase insulation paper 10 is formed of aramid paper, such as wholly aromatic polyamides, having an electrically insulating characteristic.

Upon provision of the interphase insulation paper 10, the V-phase coil group 4 is wound so as to be displaced 120° in electrical angle relative to the U-phase coil group 3 and so as to be located in the slots 6 other than those in which the U-phase coil group 3 is located. Subsequently, a plurality of pieces of the interphase insulation paper 10 for insulation of coils belonging to different phases is inserted to insulate between the coil ends of the V-phase coil group 4 and coil ends of the W-phase coil group 5. Subsequently, the W-phase coil group 5 is wound so as to be displaced 120° in electrical angle relative to the V-phase coil group 4.

Figure 5A:
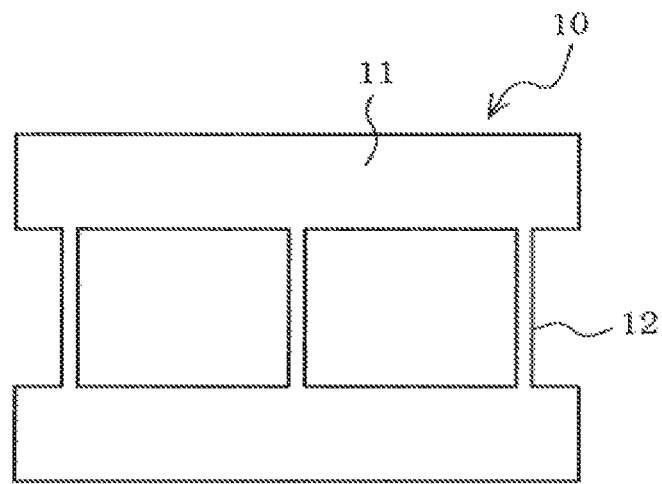
FIGS. 5A and 5B are interphase insulation paper for use between different phases and different interphase insulation paper for use between different phases, respectively.

The interphase insulation paper 10 includes a pair of elongate insulation paper bodies 11 and a plurality of connecting strips 12 which connect the paired insulation paper bodies 11 with each other, as shown in FIG. 5A. The paired insulation paper bodies 11 are disposed at both ends of the stator core 2 with respect to a stacked direction of the core pieces of the stator core 1 (hereinafter, "an axial direction"). The connecting strips 12 are integrally formed with the insulation paper bodies 11 into a band shape having a length that is substantially the same as the axial dimension of the stator core 2 (the thickness in the stacked direction of the core pieces). More specifically, when the connecting strips 12 are inserted into the slots 6 from the inner circumference side of the stator core 2, the paired insulation paper bodies 11 protrude out of both axial end surfaces of the stator core 2.

Thus, the stator core 2 is provided with the pieces of the interphase insulation paper 10 to insulate between the coil ends (different phases) of the stator coils. When a drive voltage or more particularly a steep inverter drive voltage is applied to the motor in an actual operation, there would occur differences in shared voltages of the unit coils in the respective phase stator coils, with a result that there is a possibility of occurrence of partial discharge between the coil ends of adjacent unit coils. In view of the problem, the interphase insulation paper 10 in the embodiment is provided with a function of insulating between the coil ends of the respective phase stator coils (belonging to the same phase).

Figure 5B:
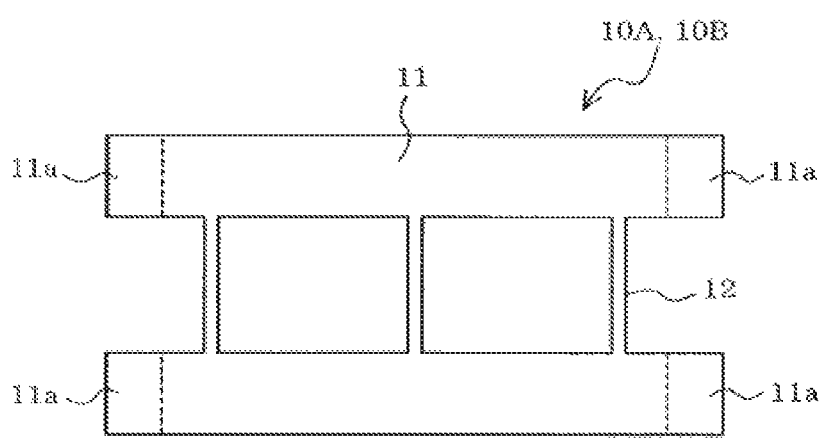
Figure 6:
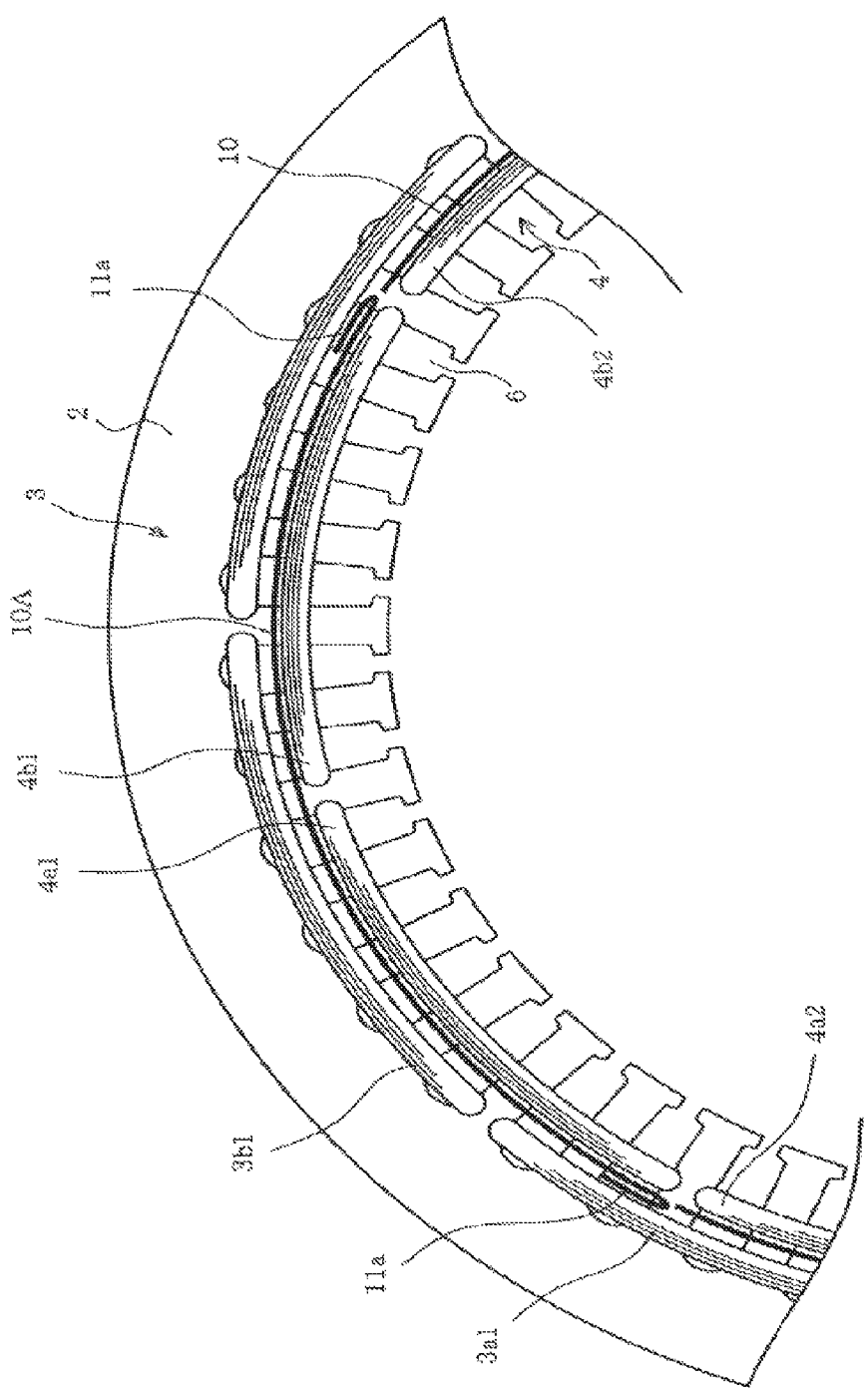
FIG. 6 is a view similar to FIG. 1, showing the state before assembly of V phase stator coils.

More specifically, the pieces of the interphase insulation paper 10 for insulating between the coil ends of the U-phase coil group 3 and the next V-phase coil group 4 include one piece which will be designated by reference symbol "10A," and the pieces of the interphase insulation paper 10 for insulating between the coil ends of the V-phase coil group 4 and the W-phase coil group 5 include one piece which will be designated by reference symbol "10B." The interphase insulation paper pieces 10A and 10B have respective insulation paper bodies 11 having lengthwise dimensions that are set so as to be larger than that of the interphase insulation paper 10 so that bent portions 11a are formed on both ends of the insulation paper bodies 11, respectively, as shown in FIG. 5B.

The interphase insulation paper 10A for insulation of coils belonging to different phases is disposed so as to insulate between the coil ends of the first unit coil 4a1 of the first series circuit 4a of the V-phase coil group 4 and the first unit coil 4b1 of the second series circuit 4b and the coil ends of the first unit coil 3a1, the first and second unit coils 3b1 and 3b2 of the second series circuit 3b. The bent portions 11a at both ends of the interphase insulation paper 10A are bent to the inner circumference side thereby to be inserted between the coil ends of the first unit coil 4a1 of the first series circuit 4a of the V-phase coil group 4 and of the second unit coil 4a2 circumferentially adjacent to the first unit coil 4a1 and further between the coil ends of the first unit coil 4b1 of the second series circuit 4b and the second unit coil 4b2 circumferentially adjacent to the first unit coil 4a1, respectively. Thus, the interphase insulation paper 10A functions as interphase insulation paper for insulation of coils belonging to the same phase to insulate between the coil ends of the first and second unit coils 4a1 and 4a2 belonging to the same phase.

Figure 1:
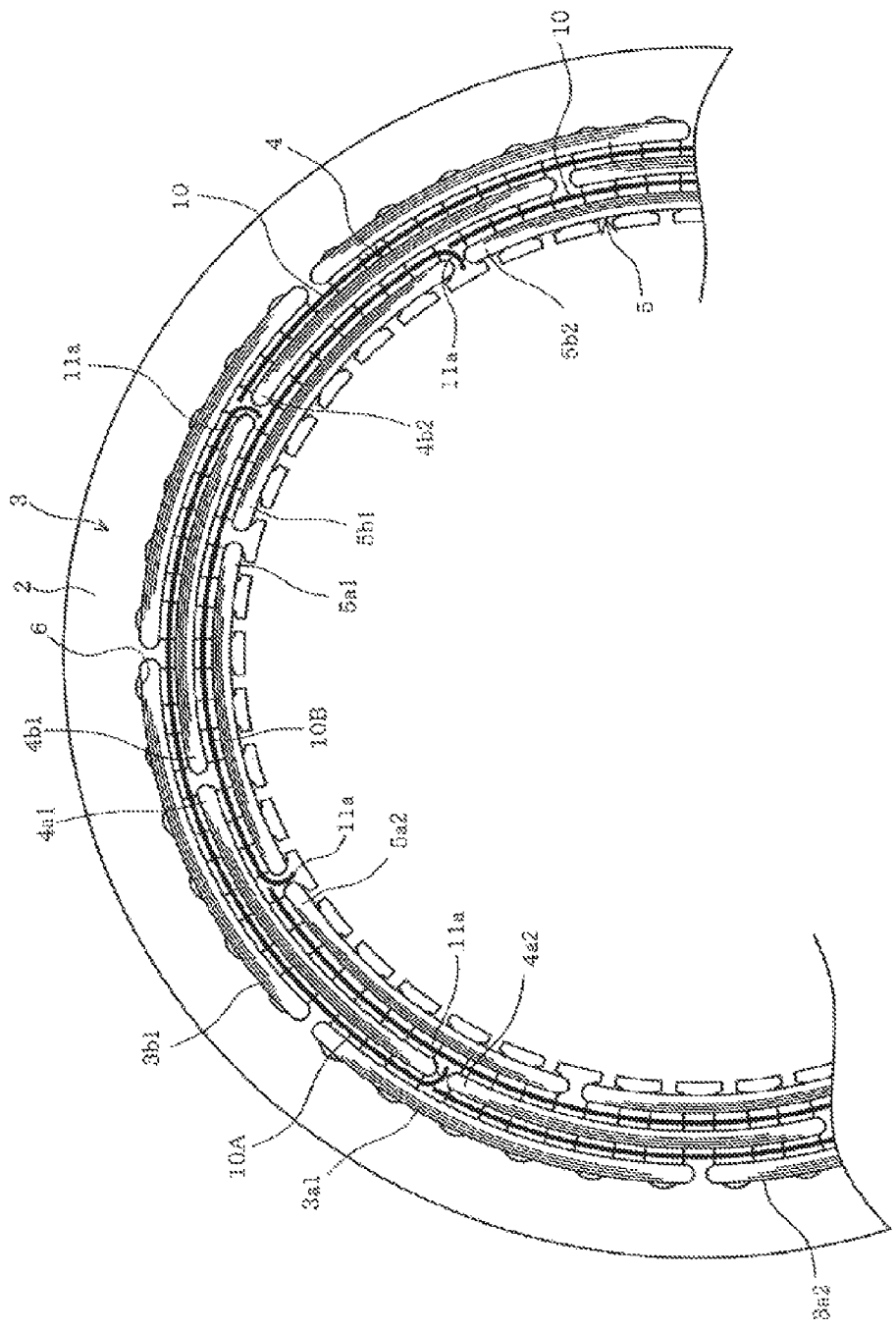
FIG. 1 is a partially enlarged perspective view of the stator according to a first embodiment.

Furthermore, as shown in FIG. 1, the interphase insulation paper 10B is disposed so as to insulate between coil ends of the first unit coils 5a1 and 5b1 of the first and second series circuits 5a and 5b of the W-phase coil group 5 and coil ends of the first unit coil 4a1 of the first series circuit 4a of the V-phase coil group 4 located at the outer circumference side of the first unit coils 5a1 and 5b1 and the first and second unit coils 4b1 and 4b2 of the second series circuit 4b. The bent portions 11a at both ends of the interphase insulation paper 10B are bent to the inner circumference side to be inserted between coil ends of the first unit coil 5a1 of the first series circuit 5a of the W-phase and the second unit coil 5a2 circumferentially adjacent to the first unit coil 5a1 and further between coil ends of the first unit coil 5b1 of the second series circuit 5b and the second unit coil 5b2 circumferentially adjacent to the first unit coil 5b1. Consequently, the interphase insulation paper 10B functions as interphase insulation paper for insulation of coils belonging to the same phase to insulate between the coil ends of the first and second unit coils 5a1 and 5a2 both belonging to the same W-phase and further between the coil ends of the first and second unit coils 5b1 and 5b2 both belonging to the same W-phase.

The following will describe the working of the interphase insulation paper pieces 10A and 10B for insulation of coils belonging to the same phase, configured as described above. Each of the above-described stator coils is not formed by directly winding a wire on the stator core 2 but is formed by an insert method in which unit coils are firstly formed and then wound on the stator core 2. In this case, each slot coil is formed so as to be slightly longer than a distance between the slots 6 into which the coil is to be inserted (a distance corresponding to six slots in the embodiment) for improvement in the working efficiency. Accordingly, there is a possibility that coil ends of the adjacent unit coils belonging to the same phase may contact with each other regarding the V- and W-phase coil groups 4 and 5 located particularly at the inner circumference side relative to the U-phase coil group 3 on both ends of the stator core 2. In view of this, the above-described bent portions 11a of the interphase insulation paper pieces 10A and 10B are inserted between the coil ends of the unit coils, whereupon insulation between the coil ends of the unit coils of the stator coils can be realized.

In the case of the stator coils configured by connecting a plurality of unit coils (see FIG. 3), the magnitude of voltage shared by the unit coils differs even among stator coils belonging to the same phase. For example, in the inverter drive system as employed in the first embodiment, unit coils located nearer to the power supply terminals 7, 8 and 9 have large shared voltage respectively.

Figure 4:
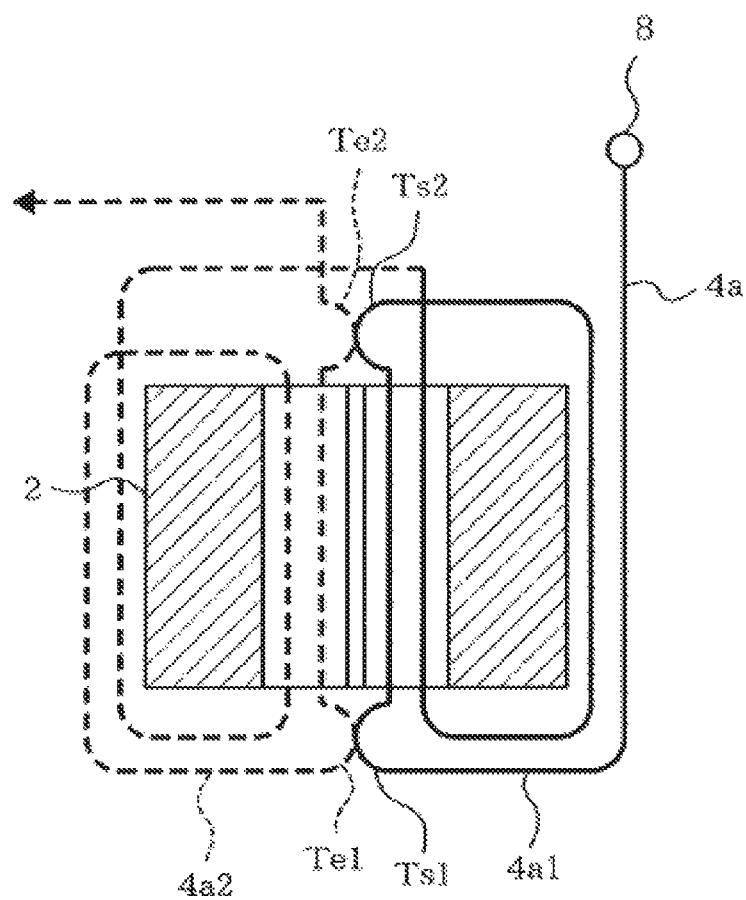
FIG. 4 is a schematic view showing a wound state of first and second unit coils.

FIG. 4 schematically illustrates the first and second unit coils 4a1 and 4a2 of the first series circuit 4a of the V-phase coil group 4. First turns Ts1 and Ts2 that are winding start ends of the first unit coil 4a1 are located between the first and second unit coils 4a1 and 4a2. Second turns Te1 and Te2 that are winding finish ends of the first and second unit coils 4a1 and 4a2 are also located between the first and second unit coils 4a1 and 4a2. The second unit coil 4a2 is wound in a direction opposite to the first unit coil. In this case, voltage from the V-phase power-supply terminal 8 side is directly applied to the first turns Ts1 and Ts2. This results in shared voltage difference between the first and second turns Ts1, Ts2 and Te1 and Te2 respectively. The voltage difference corresponds to shared voltage of two unit coils. More specifically, the first unit coil 4a1 is located nearest to the V-phase power-supply terminal 8, and the second unit coil 4a2 is adjacent to the first unit coil 4a1. The potential difference in the V-phase coils 4 becomes largest between the first and second unit coils 4a1 and 4a2, so that partial discharge tends to occur most frequently in the part between the first and second unit coils 4a1 and 4a2. The aforementioned condition can also occur between the first and second unit coils 4b1 and 4b2 of the second series circuit 4b of the V-phase coil group 4, between the first and second unit coils 5b1 and 5b2 of the first series circuit 5a of the W-phase coil 5, and between the first and second unit coils 5b1 and 5b2 of the second series circuit 5b. The U-phase coil group 3 will be described in this regard later.

Hence, in the first embodiment, the bent portions 11a of the interphase insulation paper pieces 10A and 10B for insulation of coils belonging to different phases are inserted between the coil ends of the first and second unit coils having a highest possibility of occurrence of partial discharge, of the unit coils of the V-phase coil group 4 and W-phase coil group 5, thereby functioning as the pieces of interphase insulation paper for insulation of coils belonging to the same phase, as shown in FIG. 1.

A largest potential difference also occurs between the coil ends of the first and second unit coils of the U-phase coil 3. However, the U-phase coil 3 is located at outermost circumference of the cylindrical stator core 2. Accordingly, since a sufficient distance can be ensured between the unit coils (between the coil ends), no interphase insulation paper for insulation of coils belonging to the same phase needs to be provided between the coil ends of the first and second unit coils.

The following operation is carried out in a step of winding each-phase stator coils provided on the stator core 2 in the first embodiment. The operation will be described with reference to FIG. 6. Slot insulation is applied to the slots 6 of the stator core 2, and the U-phase coil group 3 is then wound on the stator core 2 so as to be located in the innermost of the slots 6 (outer circumference side of the stator core 2). Subsequently, a plurality of pieces of interphase insulation paper 10 for insulation of coils belonging to different phases is disposed along the coil ends of the U-phase coil group 3 over an entire circumferential area of the stator core 2. The interphase insulation paper 10 is provided for insulating between the coil ends of the U-phase coil group 3 and the coil ends of the V-phase coil group 4 which are to be inserted following the U-phase coil 3. The pieces of the interphase insulation paper 10 include a piece of the interphase insulation paper 10A which is disposed with the bent portions 11a at both ends thereof being bent to the inner circumference side. Subsequently, the V-phase coil group 4 is wound on the stator core 2 so as to be located in the slots 6 other than those in which the U-phase coil group 3 is located. After the V-phase coil group 4 has been wound, the bent portion 11a at one end of the interphase insulation paper 10A is bent to the inner circumference side along a counterclockwise corner of the first unit coil 4a1 with a tool (not shown) to be inserted between the coil ends of the first and second unit coils 4b1 and 4b2. The bent portion 11a at the other end of the interphase insulation paper 10A is bent to the inner circumference side along a clockwise corner of the first unit coil 4b1 with the tool (not shown) to be inserted between the coil ends of the first and second unit coils 4b1 and 4b2. Thus, both ends of the interphase insulation paper 10A are previously bent to the inner circumference side. This can simplify the operation (work) for inserting the bent portion 11a between the coil ends of the first and second unit coils 4a1 and 4a2 and between the coil ends of the first and second unit coils 4b1 and 4b2. Subsequently, the pieces of the interphase insulation paper 10 are inserted to insulate the coil ends of the V-phase coil group 4 and the coil ends of the W-phase coil group 5. In this case, the bent portions 11a at both ends of the piece of the interphase insulation paper 10B are previously bent to the inner circumference side. Thereafter, the W-phase coil group 5 is wound so as to be displaced 120° in electrical angle relative to the V-phase coil 4. The bent portions 11a at both ends of the piece of the interphase insulation paper 10B are also operated in the same manner as the bent portions 11a of the piece of the interphase insulation paper 10A.

The following advantageous effects can be achieved from the above-described first embodiment. The pieces of the interphase insulation paper 10 for insulating between coil ends of the unit coils of each-phase stator coils include the piece of the interphase insulation paper 10A and the piece of the interphase insulation paper 10B having the bent portions 11a at the respective both ends of the papers 10A and 10B. The bent portions 11a are inserted, as the pieces of the interphase insulation paper for insulation of coils belonging to the same phase, between the coil ends of the first and second unit coils of the V- and W-phase coil groups 4 and 5 located at the inner circumference side relative to the U-phase coil group 3. Consequently, parts having a higher possibility of occurrence of partial discharge during actual operation can effectively be insulated. Furthermore, each piece of the interphase insulation paper 10A and the interphase insulation paper 10B has slightly larger dimensions than the other pieces of the interphase insulation paper 10, so that the interphase insulation between the phases which are the same can be carried out by a part of each one of the interphase insulation paper pieces 10A and 10B. This can reduce the material costs of the insulation paper and prevent significant increase in the costs.

Furthermore, a high quality permanent magnet motor can be manufactured which is free of insulation failure such as contact between the unit coils and has reduced possibility of occurrence of partial discharge.

Second Embodiment

Figure 7:
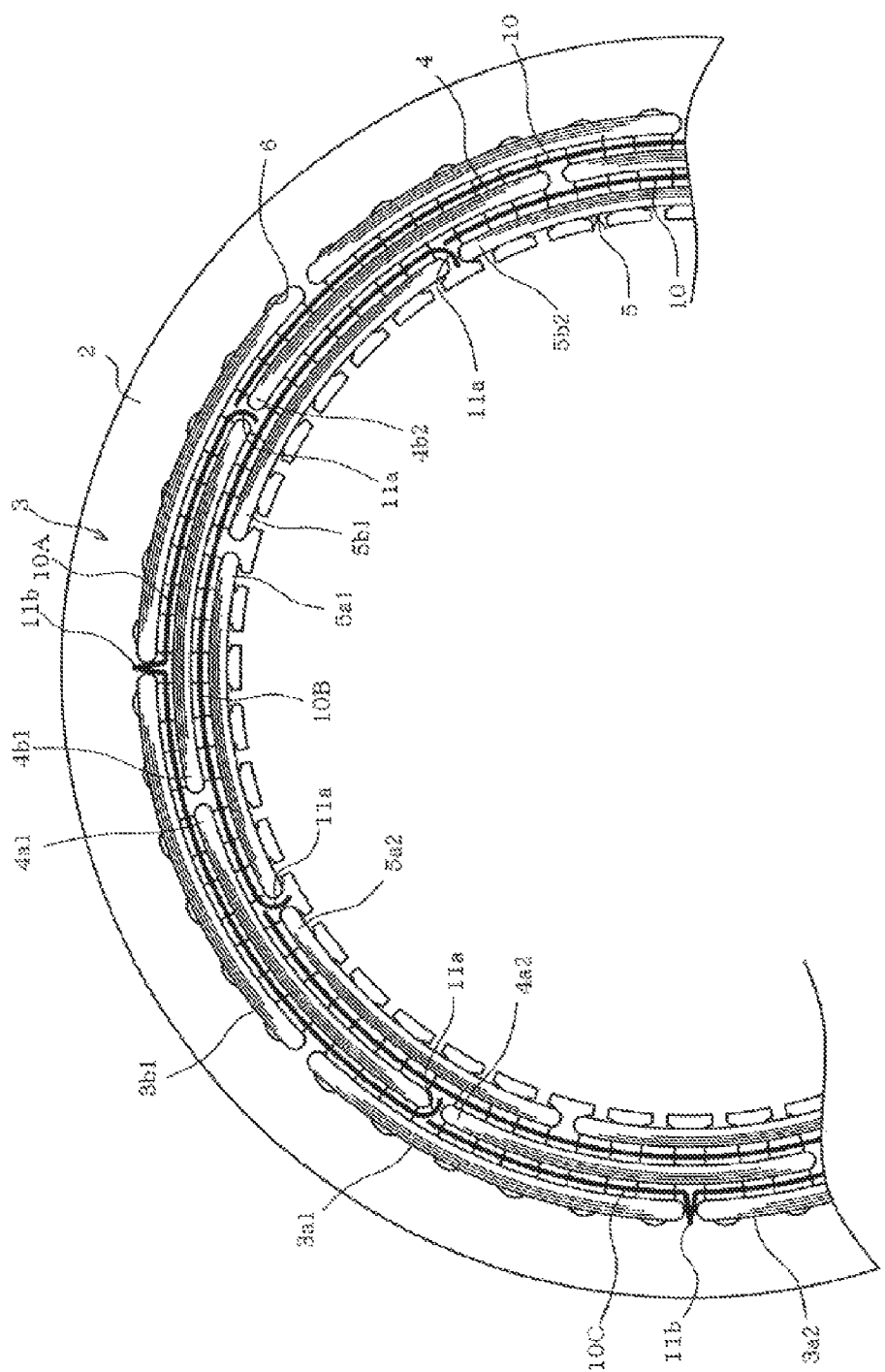
FIG. 7 is a view similar to FIG. 1, showing a second embodiment.

FIG. 7 illustrates a second embodiment. In the second embodiment, identical or similar parts are labeled by the same reference symbols as those in FIG. 1 in the first embodiment.

In the second embodiment, the interphase insulation paper 10A for insulation of coils belonging to different phases has a lengthwise dimension set to be larger than in the first embodiment. The interphase insulation paper 10A has a bent portion 11b which is formed in a middle portion thereof so as to protrude to the outer circumference side. The bent portion 11b is inserted between the coil ends of the first unit coil 3b1 of the U-phase coil group 3 and the second unit coil 3b2 circumferentially adjacent to the first unit coil 3b1. A piece of interphase insulation paper 10C circumferentially counterclockwise adjacent to the interphase insulation paper 10A has a lengthwise dimension that is set to be larger than the other pieces of the interphase insulation paper 10. The interphase insulation paper 10C has a middle part formed with a bent portion 11b protruding to the outer circumference side. The bent portion 11b is inserted between coil ends of the first unit coil 3a1 of the U-phase coil group 3 and the second unit coil 3a2 circumferentially adjacent to the first unit coil 3a1, whereby the interphase insulation paper 10C serves as interphase insulation paper for insulation of coils belonging to the same phase.

The second embodiment can achieve the same advantageous effects as the first embodiment. In particular, the insulating performance can further be improved since the pieces of the interphase insulation paper 10A and 10C are also inserted between the coil ends of the first and second unit coils of the U-phase coil group 3 as the interphase insulation paper for insulation coils belonging to the same phase.

Third Embodiment

Figure 8:
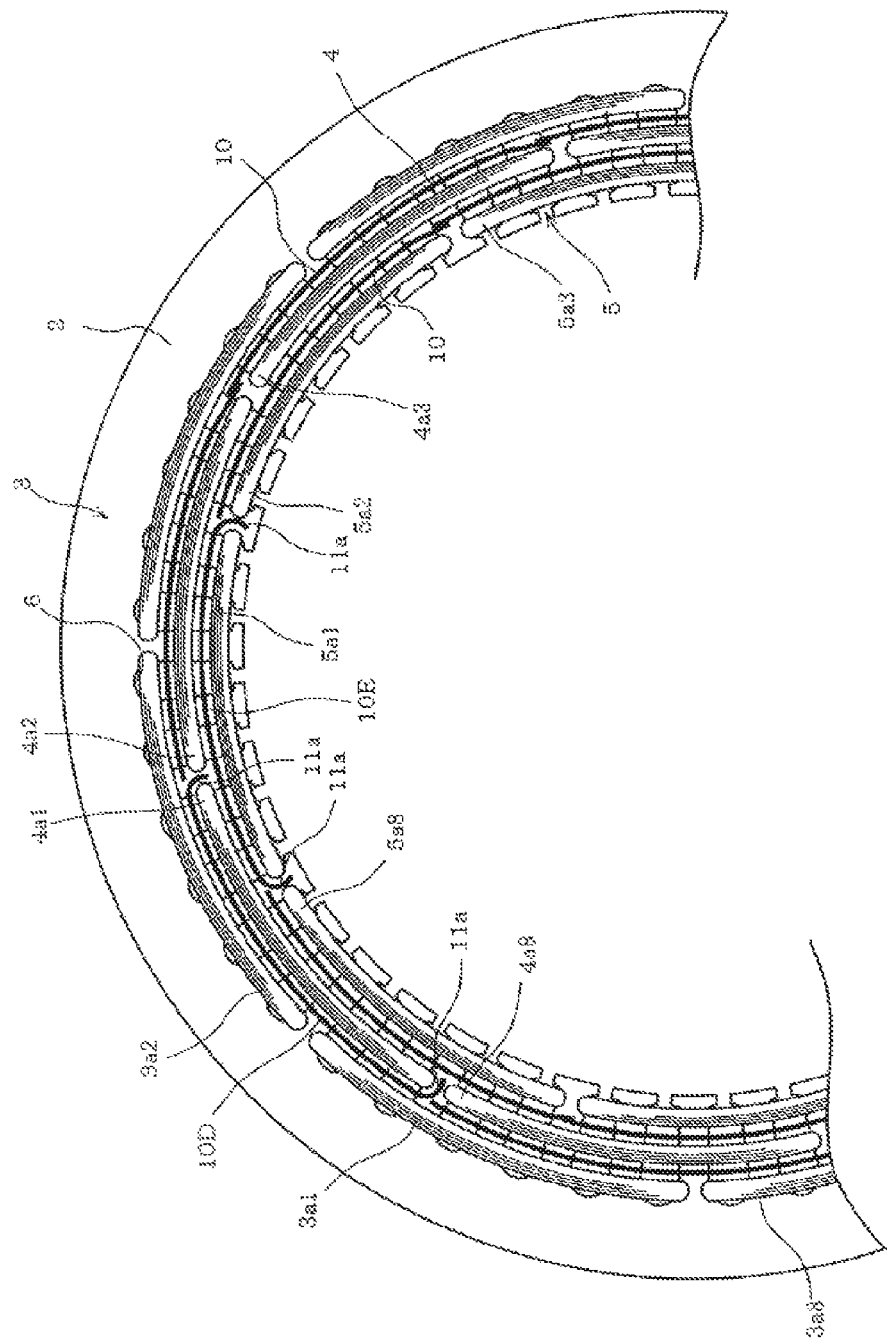
FIG. 8 is a view similar to FIG. 2, showing a third embodiment.
Figure 9:
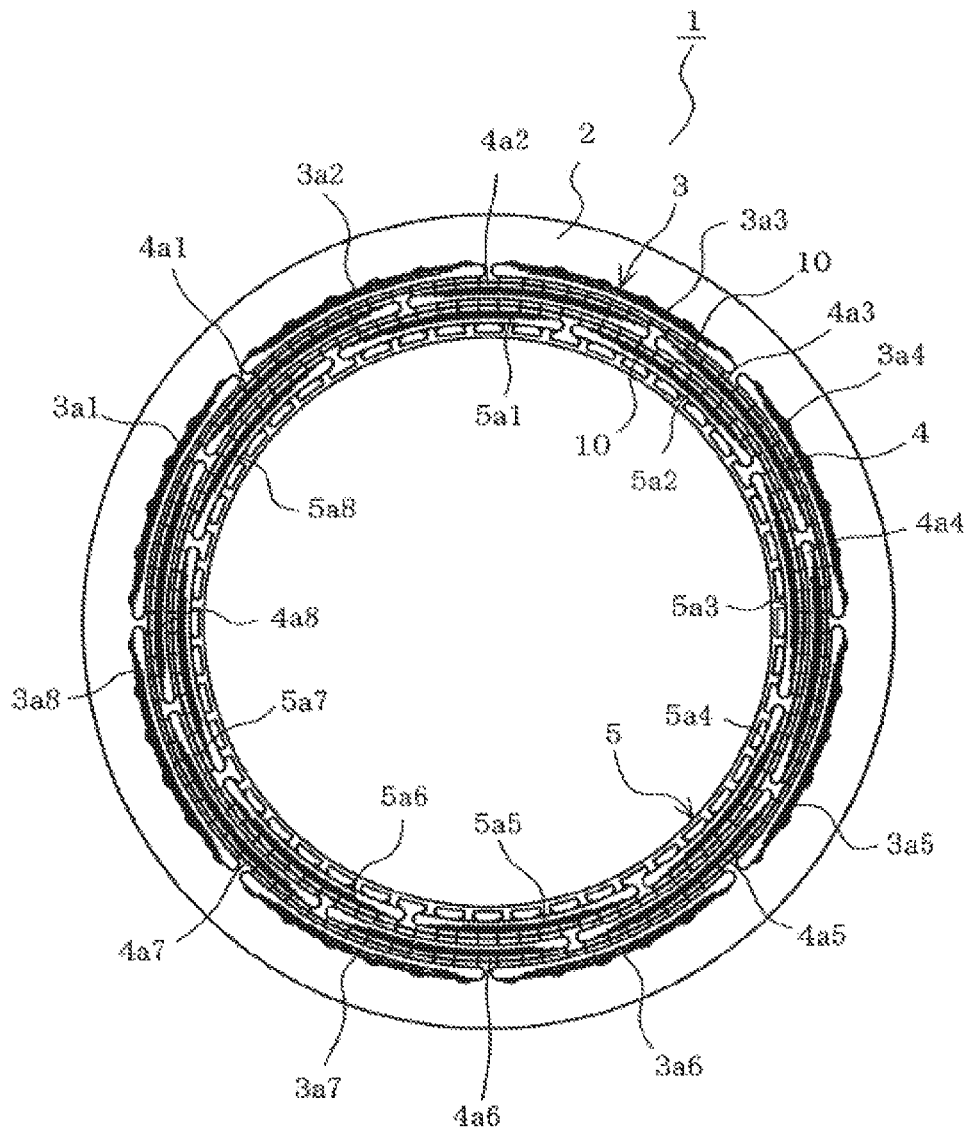
FIG. 9 is a view similar to FIG. 2.

FIGS. 8 and 9 illustrate a third embodiment. In the third embodiment, identical or similar parts are labeled by the same reference symbols as those shown in FIGS. 1 and 2 in the first embodiment.

In the third embodiment, as shown in FIG. 9, the U-phase coil group 3 includes eight series-connected unit coils 3a1 to 3a8, the V-phase coil group 4 includes eight series-connected unit coils 4a1 to 4a8 and the W-phase coil group 5 includes eight series-connected unit coils 5a1 to 5a8. One terminal of each series-circuit is connected to the power-supply terminal of each phase, and the other terminal of each series circuit is connected to the neutral terminal. The series circuits are connected into a star connection. The unit coils 3a1-3a8, 4a1-4a8 and 5a1-5a8 are wound so that adjacent coils have polarities opposite to each other.

In the third embodiment, too, a plurality of pieces of interphase insulation paper 10 is provided to insulate between coil ends of the unit coils of the U- and V-phase coil groups 3 and 4, and another plurality of pieces of interphase insulation paper 10 is provided to insulate between coil ends of the unit coils of the V- and W-phase coil groups 4 and 5.

A plurality of pieces of interphase insulation paper 10 insulating between the coil ends of the unit coils of the U- and V-phase coils 3 and 4 includes a piece of interphase insulation paper 10D which is adapted to insulate between the coil ends of the first unit coil 4a1 of the V-phase coil group 4 and the unit coils of the U-phase coil group 3. The interphase insulation paper 10D has both ends formed with bent portions 11a which are inserted between coil ends of the first unit coil 4a1 and of the eighth and second unit coils 4a8 and 4a2 located at both circumferential sides of the first unit coil 4a1, thereby functioning as the interphase insulation paper for insulation of coils belonging to the same phase.

Furthermore, a plurality of pieces of interphase insulation paper 10 insulating between the coil ends of the unit coils of the V- and W-phase coil groups 4 and 5 includes a piece of interphase insulation paper 10E which is adapted to insulate between the coil ends of the first unit coil 5a1 of the W-phase coil group 5 and the unit coils of the V-phase coil group 4 located at the outer circumference side of the first unit coil 5a1. The interphase insulation paper 10E has both ends formed with respective bent portions 11a which are inserted between coil ends of the first unit coil 5a1 and of the eighth and second unit coils 5a8 and 5a2 located at both circumferential sides of the first unit coil 5a1, thereby functioning as the interphase insulation paper for insulation of coils belonging to the same phase.

In the third embodiment, the eight unit coils 3a1 to 3a8 of the U-phase coil group 3 are series-connected, the eighth unit coils 4a1 to 4a8 of the V-phase coil group 4 are series-connected, and the eighth unit coils $5a1$ to $5a8$ of the W-phase coil group 4 are series-connected. The unit coils $3a1$ to $3a8$, $4a1$ to $4a8$ and $5a1$ to $5a8$ are further connected into the star connection. In this configuration, a large potential difference may occur between the coil ends of the first unit coil $4a1$ of the V-phase coil group 4 and the eighth and second unit coils $4a8$ and $4a2$ located at both circumferential sides of the first unit coil $4a1$ and between the coil ends of the first unit coil $5a1$ of the W-phase coil group 5 and the eighth and second unit coils $4a8$ and $5a2$ located at both circumferential sides of the first unit coil $5a1$.

In the third embodiment, the bent portions $11a$ of both ends of the interphase insulation paper pieces 10D and 10E are inserted between the coil ends of the first unit coil $4a1$ and the eighth and second coil ends $4a8$ and $4a2$ and between the coil ends of the first unit coil $5a1$ and the eighth and second unit coils $5a8$ and $5a2$, between which coil ends large potential difference may occur. Accordingly, the third embodiment can achieve the same advantageous effects as those in the first embodiment. Additionally, no interphase insulation paper for insulation of coils belonging to the same phase is provided for the U-phase coil 3 located at the outermost circumference side for the reason described in the first embodiment.

Fourth Embodiment

Figure 10:
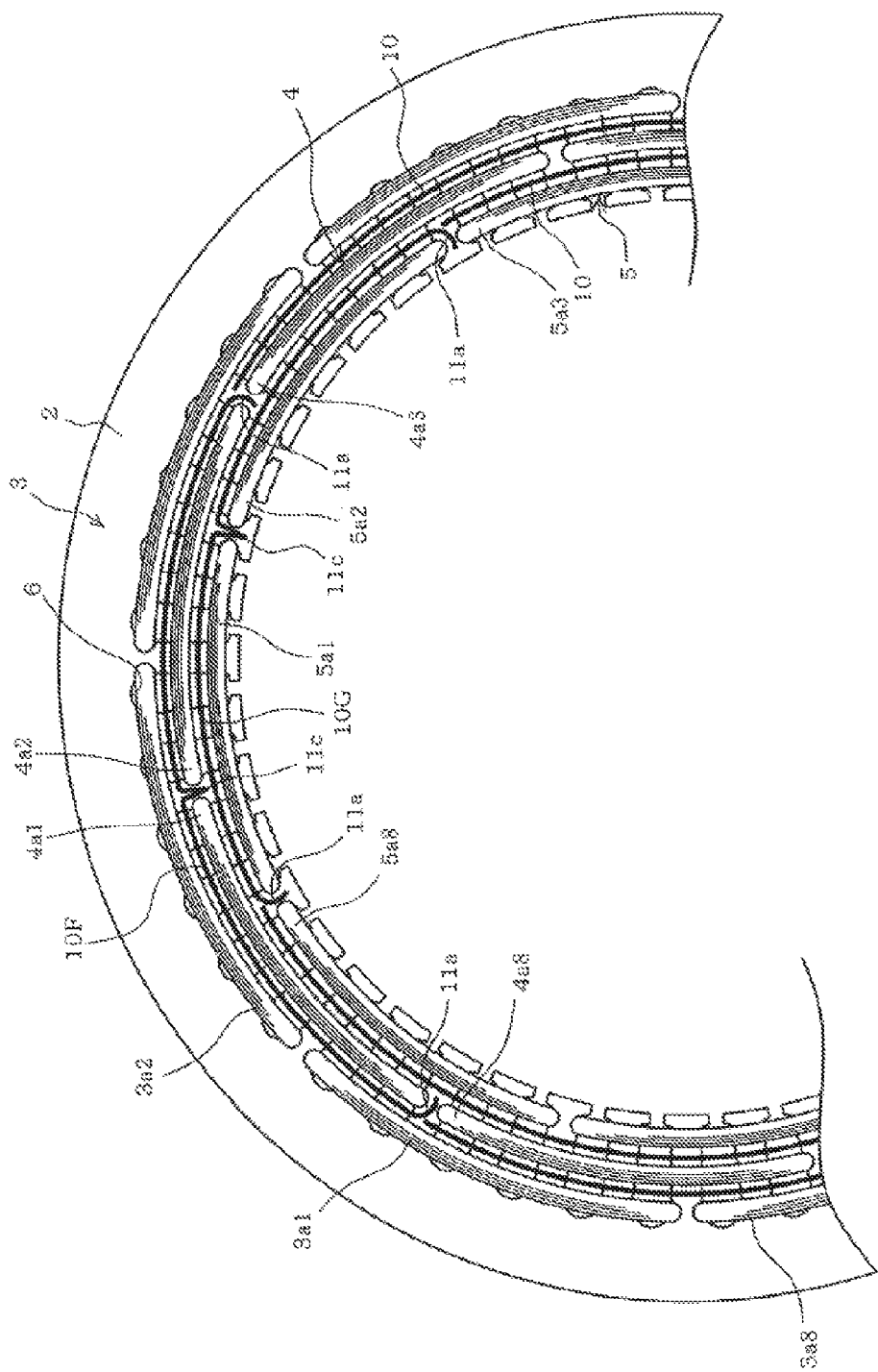
FIG. 10 is a view similar to FIG. 1, showing a fourth embodiment.

FIG. 10 illustrates a fourth embodiment. In the fourth embodiment, identical or similar parts are labeled by the same reference symbols as those shown in FIG. 8 in the third embodiment.

In the fourth embodiment, a plurality of pieces of interphase insulation paper 10 insulating between the coil ends of the unit coils of the U- and V-phase coil groups 3 and 4 includes a piece of interphase insulation paper 10F which is inserted between the coil ends of the first and second unit coils $4a1$ and $4a2$ of the V-phase coil group 4 and the coil ends of the eighth and third unit coils $4a8$ and $4a3$ located at both circumferential sides of the first and second coil ends $4a1$ and $4a2$. The interphase insulation paper 10F has the bent portion $11c$ formed by inwardly bending a central part thereof as the middle part. The bent portion $11c$ is inserted between the coil ends of the first and second unit coils $4a1$ and $4a2$, whereby the interphase insulation paper 10F functions as the interphase insulation paper for insulation of coils belonging to the same phase.

Furthermore, a plurality of pieces of interphase insulation paper 10 insulating between the coil ends of the unit coils of the V- and W-phase coil groups 4 and 5 includes a piece of interphase insulation paper 10G which is adapted to insulate between the coil ends of the first and second unit coils $5a1$ and $5a2$ of the W-phase coil group 5 and the unit coils of the V-phase coil group 4 located at the outer circumference side of the first and second unit coils $5a1$ and $5a2$. The interphase insulation paper 10G has both ends formed with bent portions $11a$ which are inserted between coil ends of the first and second unit coils $5a1$ and $5a2$ and the coil ends of the eighth and third unit coils $5a8$ and $5a3$ located at both circumferential sides. The bent portion $11c$ formed by inwardly bending the central part thereof as the middle part is inserted between coil ends of the first and second unit coils $5a1$ and $5a2$, whereby the interphase insulation paper 10G functions as the interphase insulation paper for insulation of coils belonging to the same phase.

The fourth embodiment can achieve the same advantageous effects as those of the third embodiment. In particular, the bent portions $11a$ of the interphase insulation paper pieces 10F and 10G are inserted between the coil ends of the second unit coils $4a2$ and $5a2$ and the coil ends of the third unit coils $4a3$ and $5a3$ respectively. Consequently, the insulating performance can further be improved.

Other Embodiments

Figure 11:
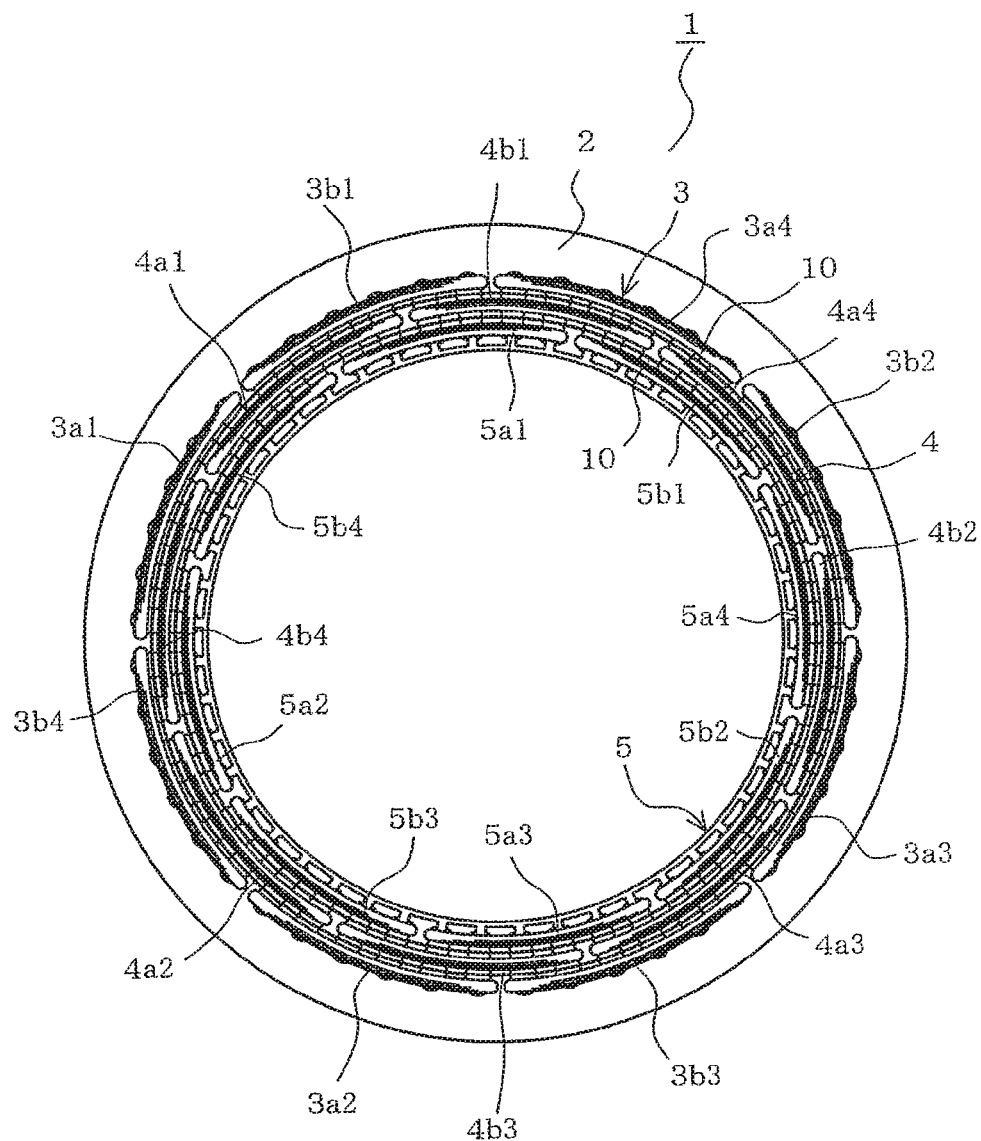
FIG. 11 is a schematic view of the stator, showing an alternate pole connection manner.

Although the unit coils of the stator coils are connected into the adjacent pole connection in the first and second embodiments, the unit coils may be connected into an alternate pole connection as shown in FIG. 11, instead.

Although the three-phase permanent magnet motor of the inverter drive system is exemplified in the foregoing embodiments, the number of phases, the drive system and the like should not be limited to those described above. For example, an electric motor of the outer rotor type or an induction motor may be employed, or a rotating electrical machine such as a generator may be employed. Of course, a rotating electrical machine used for purposes other than use in the vehicles may be employed.

According to the above-described embodiments, the stator includes a stator core, stator coils of a plurality of phases wound on the stator core and composed of a plurality of unit coils, and a plurality of pieces of interphase insulation paper for insulation of coils belonging to different phases, disposed between coil ends of unit coils belonging to different phases in the stator coils of the plurality of phases. One of the pieces of interphase insulation paper serves as an interphase insulation paper for insulation of coils belonging to the same phase, having ends inserted between coil ends of the unit coils belonging to the same phase. Consequently, insulation between the coil ends of the unit coils belonging to the same phase can be realized by the use of the interphase insulation paper with a simple configuration, and a large increase in the costs with increase in the number of working steps and an increase in the material costs can be suppressed.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A stator of a rotating electrical machine, comprising:
a stator core which is annular in shape;
a plurality of stator coil groups constituting a plurality of phases, each-phase stator coil group being wound on the stator core and including a plurality of unit coils connected to each other and arranged in a radial direction with respect to the stator core;
a plurality of pieces of interphase insulation paper for insulation of coils belonging to different phases, disposed at both axial ends of the stator core between coil ends of the unit coils which belong to different phases and is disposed at a radially inner circumference side with respect to the stator core, said interphase insulation paper pieces having ends which are inserted between the coil ends of the unit coils belonging to an identical phase, respectively, thereby to function as interphase insulation paper for insulation of coils belonging to the identical phase; and
a plurality of connecting strips formed integrally with the interphase insulation paper pieces and each connecting a pair of interphase insulation paper pieces disposed at both ends of the stator core when inserted in a slot of the stator core, wherein each-phase stator coil group includes a plurality of unit coils which are divided into a first series circuit and a second series circuit, and each one of the series circuits has one of two terminals connected to a power supply terminal and the other connected to a neutral terminal, whereby the unit coils are connected into an adjacent pole connection manner or an alternate pole connection manner; and wherein each interphase insulation paper piece for insulation of coils belonging to the different phases, functioning as the interphase insulation paper piece for insulation of coils belonging to the identical phase, insulates between coil ends of the first unit coils of the respective first and second series circuits constituting a stator inner circumference side phase and coil end of the unit coil constituting a stator outer circumference side phase, said each interphase insulation paper piece having ends inserted between the coil ends of the first unit coils of the respective first and second series circuits constituting a stator inner circumference side phase and the coil end of the unit coil which is circumferentially adjacent to the coil ends of the first unit coils and constitutes a phase identical with a phase of the first unit coils of the respective first and second series circuits, said coil ends of the first unit coils having a largest shared voltage in the adjacent pole connection manner or the alternate pole connection manner out of the unit coils belonging to the identical phase.

2. A stator of a rotating electrical machine comprising:

a stator core which is annular in shape;

a plurality of stator coil groups constituting a plurality of phases, each-phase stator coil group being wound on the stator core and including a plurality of unit coils connected to each other and arranged in a radial direction with respect to the stator core;

a plurality of pieces of interphase insulation paper for insulation of coils belonging to different phases, disposed at both axial ends of the stator core between coil ends of the unit coils which belong to different phases and are disposed at a radially inner circumference side with respect to the stator core; and a plurality of connecting strips formed integrally with the interphase insulation paper pieces and each connecting a pair of interphase insulation paper pieces disposed at both ends of the stator core when inserted in a slot of the stator core;

wherein the interphase insulation paper pieces for insulation of the coils belonging to different phases have ends which are inserted between the coil ends of the unit coils belonging to an identical phase, respectively, thereby to function as interphase insulation paper for insulation of coils belonging to the identical phase;

wherein the plurality of unit coils of each-phase stator coil group is series connected into a series circuit, and the series circuit has two terminals one of which is connected to a power supply terminal and the other of which is connected to a neutral terminal, thereby to be connected into an adjacent pole connection; and wherein the plurality of interphase insulation paper pieces includes one piece which is configured to insulate between coil ends of the first and second unit coils of the phase located at an inner circumference side and coil end of the unit coil constituting the phase located at an outer circumference side, the one piece having a central part which is bent to the inner circumference side to be inserted between the coil ends of the first and second unit coils, the one piece having two ends inserted between the coil ends of the first and second unit coils and coil ends of the unit coils located at both circumferential sides of the first and second unit coils and belonging to the phase identical with the phase of the first and second unit coils, respectively.

3. A rotating electrical machine comprising the stator defined in claim 1 or 2.

* * * * *